(Model.)
J. & R. BEAN.
VELOCIPEDE.
No. 245,434.  Patented Aug. 9, 1881.
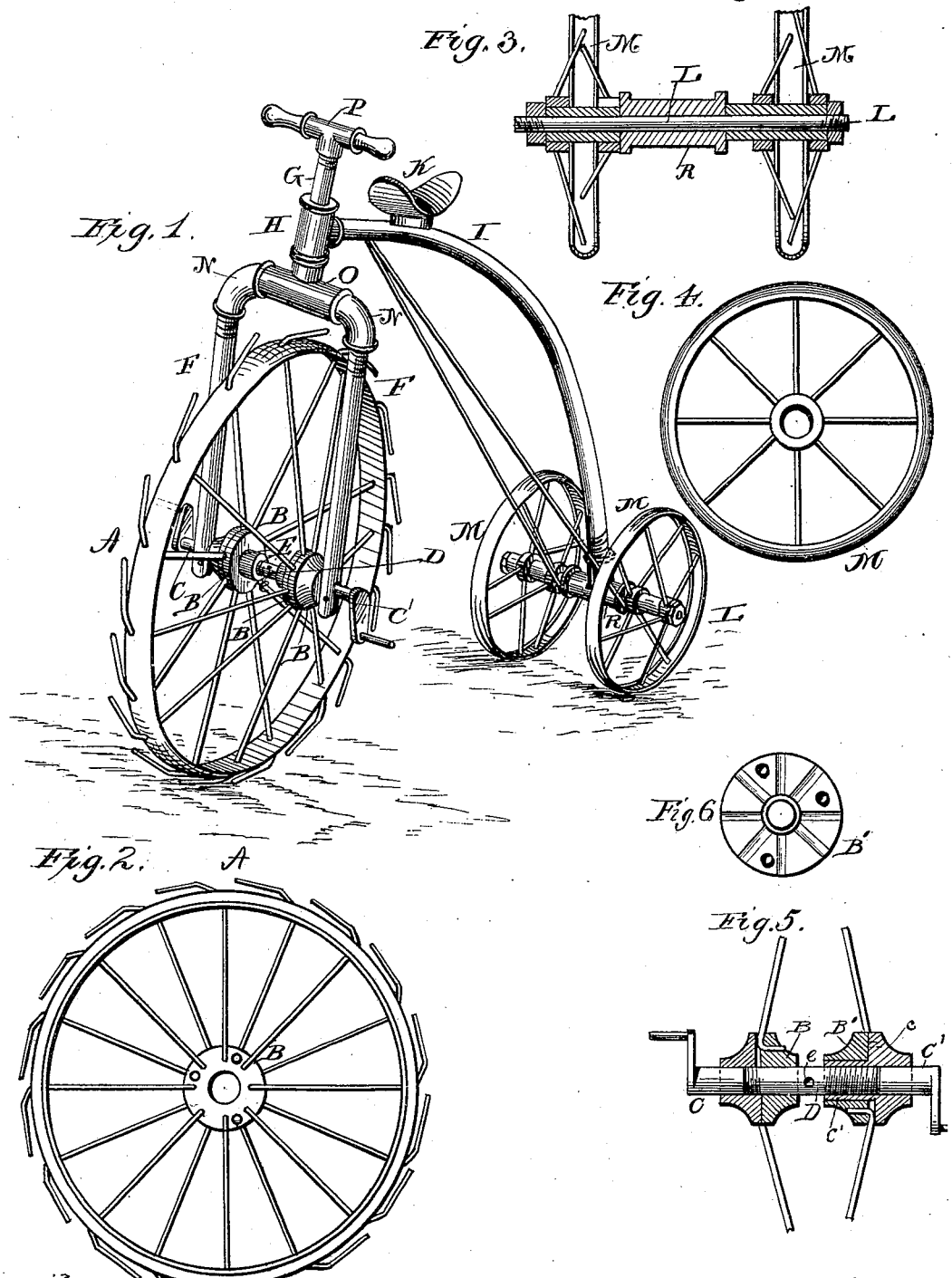
Witnesses.
F. L. Durand
J. J. McCarthy
Inventor.
John Bean 2nd
Roscoe Bean
By Alexander T. Mason
atty

United States Patent Office.

JOHN BEAN AND ROSCOE BEAN, OF SPRINGFIELD, OHIO, ASSIGNORS OF ONE-HALF TO J. M. DEARDORFF AND GEO. M. LEFFEL, OF SAME PLACE.

VELOCIPEDE.

SPECIFICATION forming part of Letters Patent No. 245,434, dated August 9, 1881.

Application filed February 23, 1881. (Model.)

*To all whom it may concern:*

Be it known that we, JOHN BEAN and ROSCOE BEAN, of Springfield, in the county of Clarke, and in the State of Ohio, have invented certain new and useful Improvements in Velocipedes; and we do hereby declare that the following is a full, clear, and exact description thereof, reference being had to the accompanying drawings, and to the letters of reference marked thereon, making a part of this specification.

This invention relates to certain improvements in velocipedes; and it has for its objects to provide an improved means for mounting the wheels in their respective bearings and for constructing the hubs of the wheels, as more fully hereinafter specified. These objects we attain by the mechanism illustrated in the accompanying drawings, in which—

Figure 1 represents a perspective view of our improved velocipede complete; Fig. 2, a side elevation of the front wheel of the velocipede; Fig. 3, a transverse section through the rear axle and wheels; Fig. 4, a side elevation of one of the rear wheels; Fig. 5, a transverse vertical section of the front wheels, showing the axle in place, and Fig. 6 a detached view of the hub B'.

The letter A indicates the forward wheel of our improved velocipede, and B B' the hubs thereof. These are each constructed in two parts, with recesses in which the inner ends of the spokes rest, the spokes being clamped between the two parts. The hub B is provided with a fixed crank, C. One part of the hub B' (indicated by the letter c) is provided with a sleeve, c', extending into the other part. The said part c is detachable, and is provided with a fixed crank, C', and the two hubs are connected by a right and left screw-rod, D, having an aperture, e, for the insertion of an instrument by means of which it may be turned.

The letter F indicates the bifurcated standard of the velocipede, which has suitable bearings at its lower ends for the crank-shafts of the forward wheels. The said standard is provided with an upright, G, which is swiveled in a bearing, H, at the forward extremity of the reach I, which carries the seat K for the rider. The rear end of the reach carries a transverse axle, L, upon which the wheels M are mounted. The said wheels are constructed with double hubs secured to suitable sleeves, which are mounted so as to rotate upon the axle, and secured by means of screw-nuts.

The outer ends of the spokes may be seated in suitable recesses in the tires of the respective wheels, or they may be passed through the same and bent backward, as indicated in Figs. 1 and 2, so as to form an external spring, or an external metallic spring may be secured to the tire.

The reach and standard of our improved velocipede are constructed of ordinary gas-pipe, the connections used for securing the parts together being constructed of the ordinary sections employed for securing such pipes at their joints.

The connections forming the upper cross-piece of the bifurcated standard are constructed of the ordinary gas-pipe elbows N, with the intermediate section O, to which the extension G is secured. This passes upward through a section or bearing, H, before mentioned. The upper end of the extension, which is constructed of ordinary gas-pipe, is screw-threaded, and has attached to it a cross-section, P, through which the handle passes or to which the handles are secured. The rear end of the reach is also provided with a cross-section, R, which serves as a support and journal for the rear axle. The lower extremities of the bifurcated standard are slotted for the reception of the axle of the forward wheel, thus forming proper bearings for the same without necessitating the usual boxes.

What we claim, and desire to secure by Letters Patent, is—

1. The hubs B B', constructed as described, and provided with fixed cranks C and C', in combination with the spokes and the tires and the right and left handed screw-shaft adapted to fit in the hubs, whereby the parts of the hub may be secured together, substantially as specified.

2. In combination with the outer portions of the hubs, the crank-shafts secured to the same, and the mechanism for clamping the hubs upon the spokes, substantially as specified.

In testimony that we claim the foregoing we have hereunto set our hands this 11th day of February, 1881.

JOHN BEAN.
ROSCOE BEAN.

Witnesses:
M. T. BURNHAM,
WM. R. HORNER.